June 3, 1941.                R. C. PIERCE                 2,244,501
                       HYDRAULIC SNUBBING DEVICE
                   Filed March 31, 1939        3 Sheets-Sheet 1

INVENTOR.
Raymond C. Pierce,
BY
ATTORNEY.

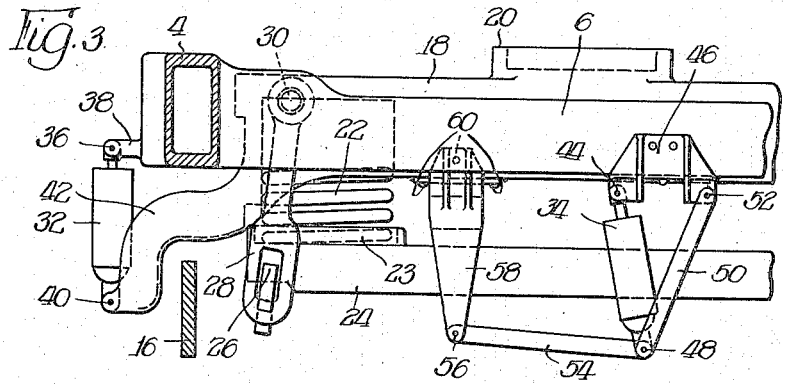
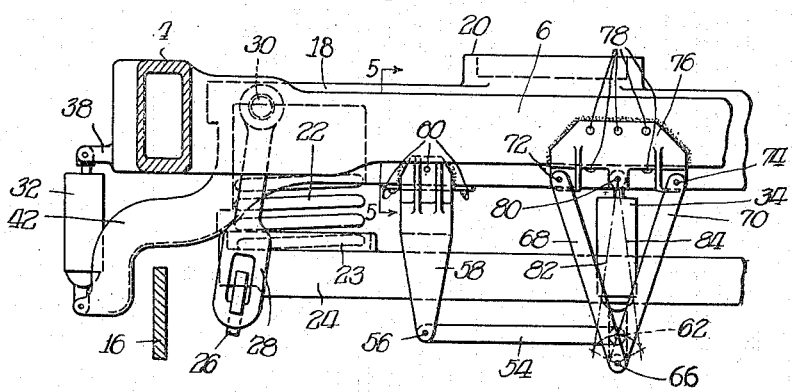
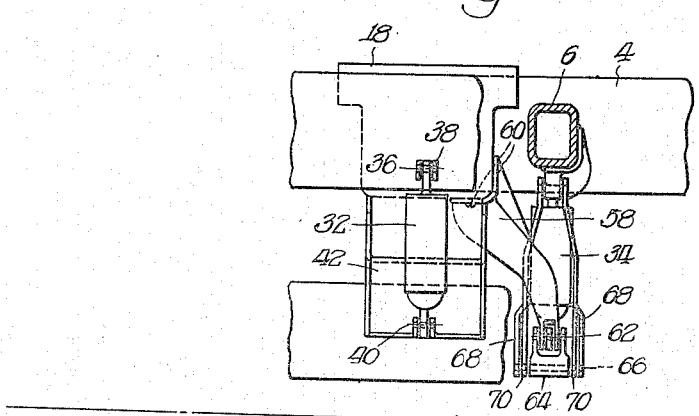

June 3, 1941.  R. C. PIERCE  2,244,501
HYDRAULIC SNUBBING DEVICE
Filed March 31, 1939  3 Sheets-Sheet 3
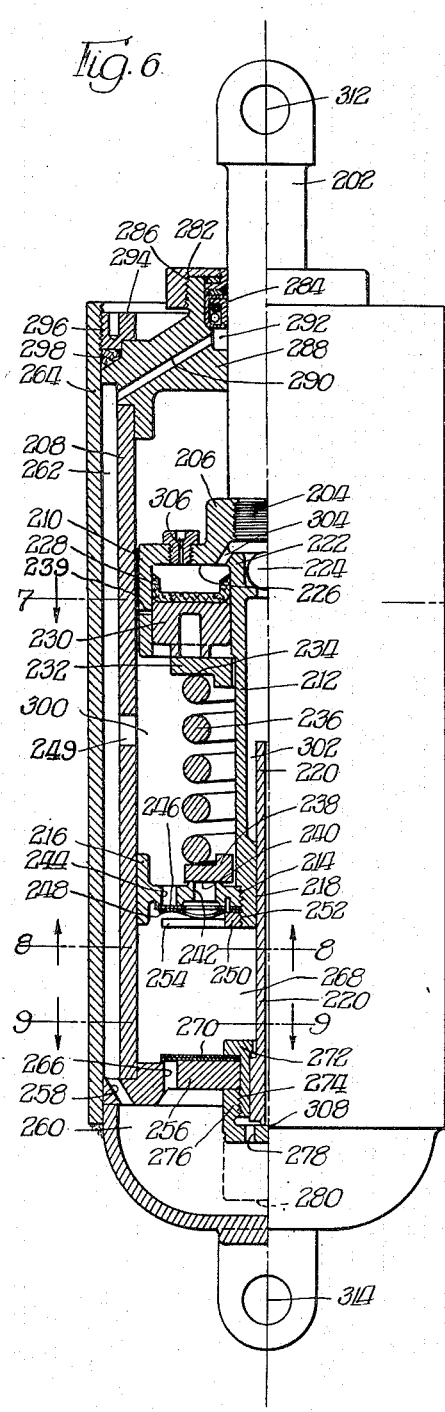
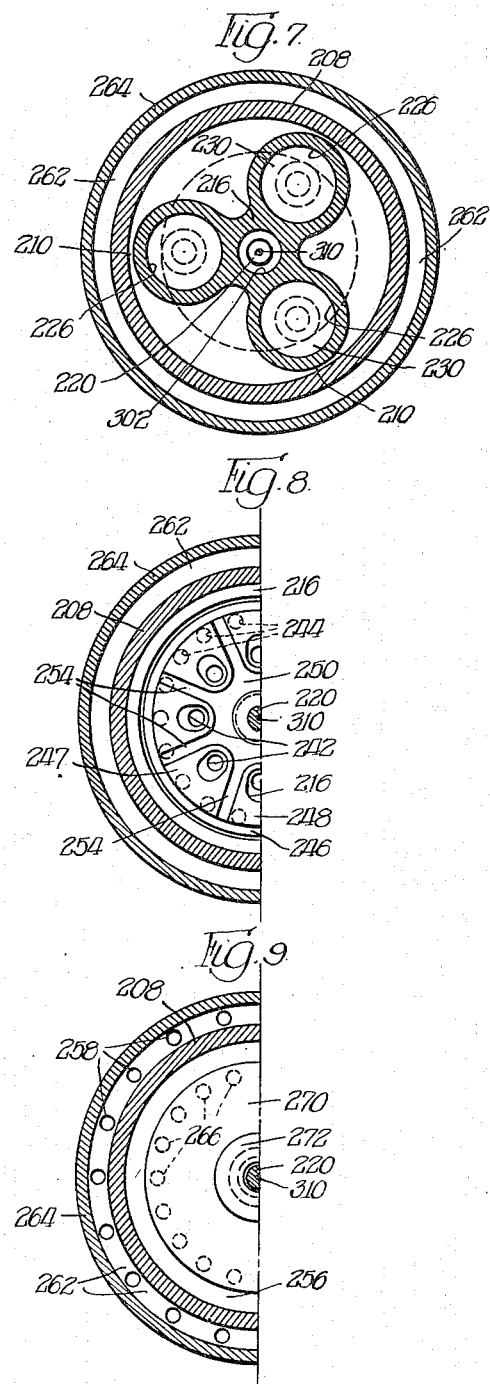
INVENTOR.
Raymond C. Pierce,
BY Orin O. B. Garner
ATTORNEY.

Patented June 3, 1941

2,244,501

UNITED STATES PATENT OFFICE 2,244,501

HYDRAULIC SNUBBING DEVICE

Raymond C. Pierce, Chicago, Ill.

Application March 31, 1939, Serial No. 265,083

20 Claims. (Cl. 188—88)

My invention relates to a ride control device for a vehicle and is particularly adaptable for vehicles which as an incident of their use may be subjected to synchronous vibrations whether caused by irregularities of the surface over which the vehicle travels or by properties of the vehicle itself, as for example, wheel irregularities.

It is well known that in many railway vehicles particularly, certain track conditions, as for example, evenly spaced low rail joints, may cause synchronous vibrations to be set up in spring suspensions which under certain circumstances are excessive. At times this synchronous movement is lateral and sometimes it is vertical. It is well known that these synchronous vibrations are a source of great destruction to lading as well as to the vehicle itself and furthermore, where the vehicle is primarily passenger carrying, great inconvenience is often caused to the occupants of the vehicle.

It is perhaps less well known that soft swinging movements are conducive to a comfortable ride. But experts in the art realize that relatively long spring travel in conjunction with means to permit a swinging motion, as for example a swinging bolster, affords the best riding conditions. In other words, it is desirable to permit a certain amount of relative movement between the frame of the truck and the relatively movable portion of the truck, usually a bolster, upon which the car body is supported. This enables the car body to have movement relative to the wheels which carry the truck and makes it possible to soften the vibrations which are transmitted to the wheels whether due to the wheels, whether due to changes in direction, or vertical shifts due to track irregularities.

As far as I am aware, all snubbing devices used in vehicles of whatever kind afford an immediate damping effect. From the above discussion it will be apparent that conditions often arise when it is not desirable to have a damping effect. In other words, relative motion between the car body and the supporting wheels is necessary for a comfortable ride. It is only when the relative motion between the parts becomes so vigorous or frequent as to prevent natural accommodation thereto that it becomes desirable to dampen the movement. For this reason I have provided a snubbing arrangement which can be adjusted as desired to meet varying requirements; for example, my device will offer no immediate resistance to the normal swinging movement between the bolster and the member supporting it when the vehicle is passing around a curve or receives some slight shock resulting in normal relative movement between the parts. But if for any reason the relative movement between the parts becomes too frequent for comfort or safety, the vibration immediately sets up a damping effect which is operative to stop the vibrations.

An object of my invention is to devise a ride control means which will be capable of controlling such synchronous vibrations whether lateral or vertical. The device is of such form that it may be constructed to become effective within wide limits and the control may be made to become operative after either a long or a short period of such vibrations as may be desired.

Another object of my invention is to devise such a ride control device which will increase in effective snubbing power as the rapidity of the vibrations or the range thereof increases.

Another object of my device is a novel snubbing arrangement for a vehicle which is suitable to dampen either vertical or lateral oscillations therein.

My invention comprehends such a ride control or snubbing device as is particularly applicable to a railway vehicle wherein a supported truck member may have vertical spring support movement with respect to the associated supporting wheel and axle assemblies or wherein one truck part may have lateral movement with respect to another truck part, as for example, a so-called swinging bolster. The device is equally suitable for application to a vehicle incorporating both of the last-mentioned features of lateral and vertical motion.

My novel invention contemplates a snubbing arrangement which may be adjusted to become operable within cited limits and therefore may be installed to permit substantial freedom of movement between the relatively movable parts within the desired limits while at the same time being immediately effective to reduce rapidly recurring vibrations of the synchronous type, thereby substantially eliminating them.

My invention comprehends a hydraulic snubbing device which is automatically effective to apply a snubbing effect with a steady increment of snubbing force as the vibration is continued, and further contemplates such a device wherein an automatic release of the device is provided which becomes effective as the vibratory motions cease.

Other objects and features incorporated in my invention may be noted in the descriptive specification of the attached drawings and the appended claims, all relating to an embodiment of the said device.

Figure 3 is a fragmentary end elevation thereof, partly in section, the section being taken through the side frame and equalizer member just outwardly of the transom.

Figure 4 is a fragmentary end elevation corresponding in general to that shown in Figure 3 with a modified arrangement for connection of my ride control device.

Figure 5 is a fragmentary side elevation of the structure shown in Figure 4, partly in section, the section being taken in a vertical plane through the transom and substantially as indicated by the line 5—5 of Figure 4.

Figure 6 is an elevation, partly in section, of the ride control device itself, the section being taken substantially in a vertical plane bisecting the main cylinder and a sub-cylinder.

Figures 7, 8 and 9 are sectional views through the device shown in Figure 6, the sections being taken in the planes indicated respectively by the lines 7—7, 8—8 and 9—9.

Figure 1:
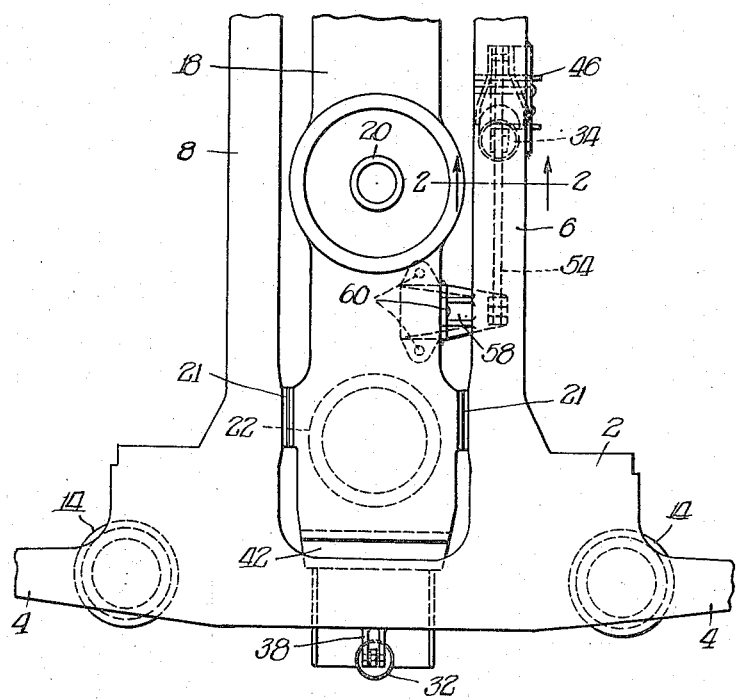
Figure 1 is a fragmentary top plan view of a railway vehicle incorporating my invention.
Figure 2:
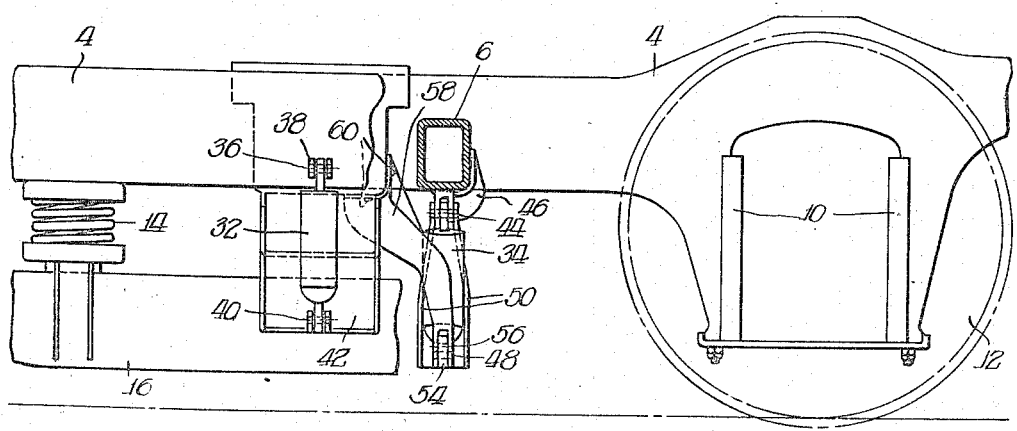
Figure 2 is a fragmentary side elevation of the structure shown in Figure 1, partly in section, the section being taken substantially in the longitudinal vertical plane bisecting the truck and as indicated by the line 2—2 of Figure 1.

Describing more particularly the application of my ride control device as shown in Figures 1 to 3, 2 is a truck side frame having the side members 4, 4 and the spaced transoms 6 and 8 integrally formed with said side members. As indicated, the truck frame is of conventional form, the side frames having the pedestal guides indicated at 10, 10 forming a means of connection to the journal ends (not shown) of wheel and axle assemblies 12, 12, said frame being resiliently supported as indicated at 14, 14 upon equalizer members 16, 16 at each side of the frame, said equalizers having support on the axle ends in the usual manner. Between the transoms 6 and 8 is supported in the usual manner the swinging bolster 18 having the center bearing indicated at 20 and guided by said transoms as indicated at 21, 21. Each end of the bolster is resiliently supported upon the coil spring indicated at 22, said coil spring being seated as at 23 upon the spring plank 24, the end of said spring plank being supported on the stirrup 26 carried in the loops at the lower end of the links 28, the upper end of each link having a pivotal support as at 30 from the adjacent transom.

In a conventional design of truck such as the type described, it is apparent that the bolster 18 may have relative movement with respect to the frame 2 both vertically and laterally thereof. The purpose of my invention is to reduce such vibrations to a point where the damage or inconvenience resulting therefrom will be eliminated. In the arrangement shown, therefore, I have provided at the end of the bolster the ride control device indicated at 32 to control the vertical vibrations and a similar device at the side of the bolster indicated at 34 to control the lateral vibrations. The form and operation of this device is more particularly described hereinafter.

The vertical control device 32 has the piston at its upper end pivotally connected as at 36 to the bracket 38 integrally formed on the side frame 4 and the lower or cylinder end of said device has a pivotal connection as at 40 to the end of the bracket 42 which is integrally formed with the end of the bolster 18 and extends therefrom laterally of the truck between the side frame 4 and the equalizer 16. It will be understood that a similar device 32 may be installed at the end of the bolster at each side of the truck.

The piston at the upper end of the lateral ride control device 34 is pivotally connected as at 44 from one end of the bracket 46 which is secured on the under side of the transom 6 and the lower end of said device 34 has a pivotal connection as at 48 to the lower ends of the paired straps 50, 50, the upper ends of said straps having a fulcrum as at 52 from the opposite end of the bracket 46. At the pivotal point 48 is connected one end of the horizontal link 54, the opposite end of said link having a pivotal connection as at 56 to the lower end of the bracket 58 which is secured as at 60, 60 on the bottom of the bolster 18.

In the modification just described as shown in Figures 1 to 3 it will be apparent that the ride control device 32 at either side of the truck will be operative to snub vertical vibrations whereas the ride control device 34 mounted adjacent the longitudinal center line of the truck will be operative to snub lateral oscillations. As the device 34 is mounted, the snubbing action takes place only when the stroke is in a given direction but in the modification hereafter described for Figures 4 and 5 the ride control device is so connected that it is double acting.

In the modification shown in Figures 4 and 5 the truck parts are like those shown in the previous modification with the bolster 18 swingingly supported adjacent the transom 6 and the lateral bracket 58 being secured to the bolster 18 at 60, 60 as in the previous modification. The lower end of the bracket 58 has a pivotal connection as at 56 with the strap 54 as in the previous modification but the opposite end of the strap 54 is pivotally connected as at 62 to the swinging link 64 and the lower end of the swinging link 64 has a pivotal connection as at 66 with the lower ends of the straps 68 and 70, each of said straps being formed of a pair of members as best seen from the view of Figure 5. The upper ends of the straps 68 and 70 are pivotally connected as at 72 and 74 to opposite ends of the bracket 76 which is secured as at 78, 78 to the transom 6 as in the previous modification. Likewise connected at the pivot point 62 is the lower end of the ride control device 34, the upper end of which has a pivotal connection as at 80 centrally of the bracket 76.

In this modification it will be apparent that the device is double acting. In other words, there will be two strokes of the piston, an upward stroke and a downward stroke, for each lateral movement from the position shown in full lines in Figure 4 toward either of the positions indicated respectively in dotted lines at 82 and 84. Otherwise the functioning of the device is similar to that described for the previous modification.

The detail structure of the ride control device is shown in Figures 6 to 9 inclusive. It may be seen that it comprises the piston rod 202, the inner end of which has threaded engagement as at 204 with the head of the piston 206. The piston 206 is a casting which has a loose fit in the cylinder 208 as indicated at 210 and centrally formed on the piston 206 is the cylindrical downward extension 212 at the bottom of which is attached as by threaded engagement as at 214 the piston head 216 closely fitted within the cylinder 208. The cylindrical portion 212 is in effect a pump plunger body having smooth sliding fit engagement at its lower end as at 218 with the hollow pump plunger 220, and said cylindrical portion 212 also has at its upper end the body portion 222 having a central cavity within which is received the ball check valve 224. The lift of the ball check valve 224 is limited by the position of the piston rod 202 screwed in the piston 206 as before described. In the upper portion of the piston 206 are formed three cylindrical downwardly directed cylinders as indicated at 226, 226 (Figure 7) and each cylinder has a packing cup 228 and a cup follower 230, each of said cup followers extending downwardly to the end of the cylinder and having thrust fit against the large washer 232 which is sleeved upon the cylinder 212 and forms a seat as at 234 for the upper end of the compression spring 236, said spring operating to hold the washer 232 against the bottom of the cylinders 226 or the pistons thereof. The spring 236 in its normal position as shown has a slight initial compression between the said washer 232 and the valve washer 238 which is seated as at 240 over a series of discharge openings 242, 242 in the piston head 216. Also in said piston head is formed a series of suction openings indicated at 244 which are closed at their lower ends by the disc valve 246 and further held thereagainst by finger springs 248 thereunder. The disc valve 246 and the finger spring assembly 248 are held in position by a locking nut 250 having threaded engagement as at 252 with the lower end of the cylindrical portion 212, said locking nut 250 having the radial arms 254, 254 (Figure 8) forming stop means for the disc valve 246 and the finger springs 248. The orifice 249 (Figure 6) in the side wall of the cylinder 208 above the piston head 216 permits free flow of liquid from said cylinder into the space 262 therearound. The lower end of the cylinder 208 is closed by the cylinder head 256, said cylinder head comprising a series of ports 258, 258 (Figure 9) permitting liquid to flow downward into the cavity 260 below the cylinder head 256 from the annular space 262 formed between the cylinder 208 and the enclosing jacket 264. Also in said cylinder head are formed a series of suction ports 266, 266 which permit liquid to be drawn from below the cylinder head 256 into the cylinder space there-above as indicated at 268. The inlet ports 266, 266 are closed by one or more superposed thin valve discs 270, said discs being held against the cylinder head 256 by the headed sleeve 272 which has threaded engagement as at 274 with the cap 276. The threaded cap 276 has a series of openings 278 which permit liquid to flow upwardly into the central opening of the pump plunger 220. To prevent the access of extraneous matter into the openings 278 a screen 280 is fitted over the openings in the bottom of the threaded cap 276. At the top of the device is formed a sealing mechanism comprising the cap nut 282 with sealing means at 284 comprising suitable washers and flange packing between said nut and the piston rod 202. The cap nut 282 has threaded engagement as at 286 with the top cylinder head 288 which serves as a guide for the piston rod 202 and is formed with a series of leakage ducts 290, 290 permitting the passage back into the annular space 262 of any liquid which may tend to follow the piston rod upwardly into the cavity 292 above the top cylinder head 288. The ring nut 294 has threaded engagement as at 296 with the jacket 264 and serves to compress the packing 298 as well as to hold the parts in assembled relationship.

For operation the device is assembled and filled approximately full with liquid, preferably oil, thus immersing all of the moving parts. The device is so installed on a vehicle that relative motion between parts of the vehicle, whose motion it is desired to control, will cause the piston rod 202 with parts attached thereto to have movement relative to the other assembled parts such as the top cylinder head 288, the cylinder 208, and the bottom cylinder head 256. When the piston rod 202 is caused to move downwardly, it carries with it the piston 206 and the various attached parts and liquid is forced upwardly as at 240 through the ports 242 beneath the valve washer 238 and into the space 300 there-above. If the compression spring 236 is only slightly compressed the resistance to the flow of liquid through the said openings 242 beneath the valve 238 is slight and offers little hindrance to the motion of the piston rod 202 relative to other parts of the assembly. When, however, the assembly, consisting of the piston rod 202, the piston 206, the cylinder 212, the piston head 216 and associated parts, moves downward relative to the pump plunger 220, liquid trapped in the space 302 above said pump plunger and below the ball check valve 224 is subjected to pressure and forced past said check valve 224 and the opening thereabove and through the orifices indicated at 304 into the cylinders 226, 226, thus acting on the packing cups 228, 228 to force downwardly the follower pistons 230, 230 as well as the washer 232 therebeneath, thus compressing the spring 236. A safety vent 239 (Figure 6) is afforded in each subcylinder 226 through which the liquid may escape into the space 300 when the pistons 230, 230 have compressed the spring 236 approximately to its solid height.

In the meantime there is a constant leakage of liquid through the orifice 306 at the top of each cylinder 226 tending to relieve pressure therein and when the pumping action delivers less liquid than can leak from said orifices, the tightening of the spring 236 is interrupted and as the flow of liquid through the said orifices becomes greater than that pumped into the cylinders, the compression of the spring 236 is gradually reduced and the resistance to the flow of liquid through the ports 242 is likewise diminished. The device is thus automatically capable of checking or snubbing relative motion between car parts and also functions automatically to free itself as the relative motion between the snubbed parts is reduced or ceases altogether.

On the upward stroke of the piston rod 202 partial vacuum occurs in the space 268 between the movable piston head 216 and the lower fixed piston head 256, causing liquid to flow downward through the suction ports 244, 244 in the movable piston head 216 past the valve 246. At the same time there is a tendency for liquid to pass upwardly through the suction ports 266, 266 in the lower fixed cylindrical head 256 past the discs 270, thus tending to keep the cylinder cavities 268 and 300 filled with liquid. The same suction which opens the inlet valves at 244 and 266 also tends to lift the pump plunger 220. This action is further aided by the suction in the chamber 302 above the pump plunger and below the ball valve 224 since said ball valve remains closed as the piston rod 202 moves upward. When the pump plunger 220 rises it uncovers a valve at its lower extremity indicated at 308, said valve being formed as a part of the pump plunger 220. As the valve at 308 is opened liquid passes through the ports at 278 therebelow and through the hollow stem of said pump plunger as indicated at 310 (Figure 8) into the space at 302, above the said pump plunger in the small cylinder 212.

As the piston 202 starts to descend the pump plunger 220 travels downwardly with the piston closing the valve at 308 and trapping the liquid in the space 302 above the plunger, thus forcing the liquid out of the cylinder 212 through the valve at 224 and through the orifices 304 into the cylinders 226.

As the piston assembly is moved up and down as thus described, the motion thereof will pump more and more liquid into the cylinders 226, 226, and continue to compress the spring 236, steadily increasing the resistance to the flow of liquid upwardly through the passages 242 as described. For any given condition a pre-determined normal rate of reciprocation may be established between the piston 206 and the cylinder 208 by fixing the rate of flow permitted through the escape orifices 306, 306 as compared with the liquid pumped into the subcylinders 226, 226. Any reciprocal movement at a faster rate will be retarded by increasing above normal the compression of the spring 236 as already described. When the reciprocal movement is reduced by such control or by subsidence of the forces causing the movement, or both, the leakage through the escape orifices 306, 306 will gradually release the control mechanism and so free it after a pre-determined normal period. In this manner, the reciprocal action is thus made effective to check the movement of the car parts between which this ride control device is connected, and the operation of the device can be varied to suit a great variety of conditions and may be adapted to exert such control in a gradual manner or very promptly.

It will thus be seen that when the pivot points 312 and 314 at the opposite extremities of the ride control device are connected between relatively moving parts of a vehicle or other structure, reciprocating motion between said parts results in a pumping action within the ride control device which automatically sets up an increasing resistance to the said pumping action until the resultant force is great enough to stop the action. The device then, as originally described, gradually frees itself from the fixed position assumed as the result of the said pumping action and is thus restored to a normal condition such as shown in Figure 6. It will be understood by those skilled in the art that this device can be designed to function either as a slow operating device or as one which builds up quickly with a few strokes of the piston. In the proportions herein shown and described it is particularly designed for operation on railway passenger equipment and for that reason is intended not to snub or become operative at relatively slow and undamaging oscillations of the parts between which the device is connected. Whenever such oscillations are of such frequency or range as to produce undesirable results, the device becomes operative and acts to reduce or eliminate the undesirable motions.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a hydraulic snubbing device, a liquid filled cylinder, a piston operable therein and comprising a piston head with a valve, a sub-cylinder, a sub-piston and resilient means between said subpiston and said valve, plunger means associated with said piston and said cylinder and operable by relative movement thereof to force liquid into said sub-cylinder and move said subpiston to compress said resilient means and restrict the opening of said valve to control said movement, and means associated with said sub-cylinder and automatically operable to release liquid therefrom, permitting reverse movement of said subpiston as said resilient means expands, thereby freeing said valve of said restriction.

2. In a hydraulic snubbing device, a liquid filled cylinder, a piston normally movable therein and comprising a sub-cylinder, a sub-piston and a valve, a resilient member between said valve and said sub-piston, means associated with said cylinder and piston and operable by reciprocal movement therebetween to pump liquid into said sub-cylinder, move said sub-piston, compress said member, and restrict the opening of said valve, thereby restraining said movement in one direction, and means associated with said sub-cylinder and operable to release liquid therefrom, thereby releasing the pressure from said subpiston, reducing the compression of said member, and releasing said valve for normal operation.

3. An inertia controlled liquid filled hydraulic device for connection between relatively movable parts of a vehicle, comprising a cylinder connected to one of said parts, a piston therein connected to the other of said parts, valves and release means in said piston and cylinder operable to permit reciprocating movement therebetween at a predetermined normal rate, supplemental pumping means associated with said piston responding to movement above said normal rate to restrict the openings of certain of said valves and reduce said rate of movement to a point where the flow of liquid through said valves and said release means is equalized, thus affording control of said reciprocal movement.

4. An inertia controlled hydraulic device for connection between relatively movable parts in a vehicle comprising a cylinder for connection to one of said parts, a piston for connection to a relatively movable part, means in said piston comprising a valve, a resilient member, and a subpiston, means responding to reciprocating movement of said piston in said cylinder to actuate said subpiston to compress said resilient member and restrict the opening of said valve, thereby controlling said reciprocal movement.

5. A liquid filled hydraulic device comprising a cylinder, a piston operable therein comprising a head having a valve and a subcylinder spaced from said head, a subpiston operable in said subcylinder, and a resilient member under compression between said valve and said subpiston, reciprocating movement of said piston in said cylinder being operable to force liquid into said subcylinder and urge said subpiston against said resilient member to restrict the opening of said valve and thus restrain said reciprocating movement.

6. In a liquid filled hydraulic device, a main cylinder, a piston operable therein comprising a piston head with a plurality of valves operable to restrict the passage of liquid through said head in reverse directions, said piston comprising a subcylinder spaced from said head, a subpiston mounted therein, and a resilient member under compression between certain of said valves and said subpiston, reciprocating movement of said piston in said cylinder being operable to force liquid into said subcylinder, move said subpiston, and compress said member to restrict the opening of the abutting valve whereby said reciprocating movement is restrained.

7. In a liquid filled hydraulic device, a main cylinder, a composite piston reciprocably operable therein comprising a piston head with valves operable respectively to restrict the flow of said liquid through said head in reverse directions, said piston comprising a subcylinder spaced from said head, a subpiston operable therein, and a resilient member under compression between said subpiston and one of said valves, reciprocating movement of said composite piston in said main cylinder operating to force liquid into said subcylinder against said subpiston to compress said member and restrict the opening of the abutting valve, whereby the flow of liquid through said head is retarded in a given direction and said reciprocal movement is restrained.

8. In a liquid filled hydraulic device, a main cylinder, a main piston operable therein and comprising a head with reversely directed valves operable respectively to restrain the flow of liquid through said head in reverse directions, said main piston comprising a plurality of subcylinders spaced from said head with subpistons therein and a resilient member extending between said subpistons and certain of said valves, reciprocating movement of said main piston in said main cylinder being operable to force liquid into said subcylinders, move said subpistons and further compress said resilient member to restrict the opening of said abutting valves and thus restrain said reciprocating movement.

9. In a liquid filled hydraulic device, a main cylinder, a main piston operable therein, said main piston comprising a piston head with valves operable to control the movement of liquid therethrough in reverse directions respectively, a subcylinder spaced from said head and having a subpiston, a resilient member under compression between said subpiston and certain of said valves, and supplemental pumping means operable by reciprocal movement of said main piston to force liquid into said subcylinder, move said subpiston and further compress said resilient member, and further restrict the opening of the valve in abutment therewith, whereby the range of said reciprocating movement may be reduced and controlled.

10. In a liquid filled hydraulic device, a main cylinder, a piston operable therein, said piston comprising a piston head with valves operable to control the movement of liquid therethrough in reverse directions respectively, a subcylinder spaced from said head and having a subpiston, a resilient member under predetermined normal compression between said subpiston and certain of said valves, and supplemental pumping means operable by reciprocal movement of said piston to force liquid into said subcylinder, move said subpiston and further compress said resilient member, and further restrict the opening of the valve in abutment therewith, whereby the range of said reciprocating movement may be reduced and controlled, and release means associated with said subpiston and automatically operable after a normal period to reduce the pressure on said subpiston and release the added compression of said member.

11. In a liquid filled hydraulic device, a main cylinder, a main piston reciprocally operable therein, said main piston comprising a head having a valve operable to prevent the flow of liquid therethrough in one direction, said main piston comprising a subcylinder spaced from said head, a subpiston operable in said subcylinder, and resilient means under compression between said subpiston and said valve to restrain the movement thereof, and supplemental pumping means operable by reciprocal movement of said main piston in said main cylinder to force liquid into said subcylinder, move said subpiston, further compress said resilient means, and further restrict the movement of said valve, whereby said reciprocating movement may be restrained.

12. In a liquid filled hydraulic device, a main cylinder, a main piston reciprocally operable therein, said main piston comprising a head having a plurality of valves operable to prevent the flow of liquid therethrough in reverse directions respectively, said main piston comprising a subcylinder spaced from said head, a subpiston operable in said subcylinder, and resilient means under pre-determined normal compression between said subpiston and one of said valves to restrain the movement thereof, supplemental pumping means operable by reciprocal movement of said main piston in said main cylinder to force liquid into said subcylinder, move said subpiston, further compress said resilient means, and further restrict the movement of the valve abutting thereagainst, and release means comprising an orifice in said subcylinder affording gradual escape therefrom of said liquid under compression, thereby permitting said subcylinder to move in the reverse direction, reducing the compression of said resilient means and freeing the said restricted valve for normal operation.

13. In a liquid filled hydraulic device, a main cylinder, a main piston reciprocally operable therein, said main piston comprising a head having a valve operable to prevent the flow of liquid therethrough in one direction, said main piston comprising a subcylinder spaced from said head, a subpiston operable in said subcylinder, and resilient means under compression between said subpiston and said valve to restrain the movement thereof, supplemental pumping means operable by reciprocal movement of said main piston in said main cylinder to force liquid into said subcylinder, move said subpiston, further compress said resilient means, and further restrict the movement of said valve, and safety means comprising an orifice in said subcylinder normally closed by said subpiston but opened thereby when said subpiston has compressed said resilient means substantially to its solid height.

14. In a liquid filled hydraulic device, a main cylinder, a main piston operable therein, a casing affording a cavity around said cylinder, said main piston comprising a piston head and a valve operable to restrict the flow of liquid therethrough, said main piston comprising a subcylinder spaced from said head, a subpiston movable therein, and a spring under pre-determined normal compression between said subpiston and said valve, supplemental pumping means comprising a hollow plunger extending through the end of said main cylinder for access to said cavity, reciprocating movement between said main cylinder and said main piston being operable by actuation of said hollow plunger to pump liquid therethrough into said subcylinder, thereby moving said subpiston to further compress said spring and further restrict the movement of said valve thereby restraining said reciprocating movement.

15. An inertia controlled hydraulic device for connection between relatively movable machine elements comprising a cylinder connected to one of said elements and a piston connected to the other thereof, means associated with the piston comprising a valve therein, a resilient member, and a subpiston, said resilient member being under compression between said valve and said subpiston, means responsive to reciprocal movement of said piston in said cylinder to actuate said subpiston to compress said resilient member and restrict the opening of said valve for control of said reciprocal movement.

16. An inertia controlled hydraulic device for connection between relatively movable machine elements comprising a cylinder connected to one of said elements, a piston connected to the other thereof, means associated with the piston comprising a valve therein, a subpiston, and a resilient member under normal precompression between said valve and said subpiston, means responsive to reciprocating movement of said piston in said cylinder to actuate said subpiston to further compress said resilient member and restrict the opening of said valve thereby controlling said reciprocal movement.

17. An inertia controlled hydraulic device for connection between relatively movable machine elements comprising a cylinder connected to one of said elements, a piston connected to the other thereof, means associated with the piston comprising a valve therein, a subpiston, and a resilient member under normal precompression between said valve and said subpiston, means responsive to reciprocating movement of said piston in said cylinder to actuate said subpiston to further compress said resilient member and restrict the opening of said valve thereby controlling said reciprocal movement, and release means associated with said subpiston and operable after a predetermined normal period to free said subpiston and return said resilient member to said normal precompression.

18. A liquid filled hydraulic device including a cylinder, a piston operable therein comprising a head having a valve, and a subcylinder spaced from said head, a subpiston operable in said subcylinder, and a resilient member under precompression between said valve and said subpiston, reciprocating movement of said piston in said cylinder being operable to force liquid into said subcylinder and further compress said resilient member to restrict the opening of said valve and so resist said reciprocating movement.

19. An hydraulic device having a main cylinder, a main piston operable therein and having a piston head with a valve therein, a subcylinder associated with said main cylinder and having a subpiston, means comprising a resilient member compressed between said valve and said subpiston operable thereby to restrain the opening of said valve, and means responsive to reciprocating movement of said main piston in said main cylinder to actuate said subpiston.

20. A liquid filled hydraulic device having a main cylinder, a main piston operable therein with a piston head having a valve, a subcylinder having a subpiston, resiliently acting means connected between said subpiston and said valve, and means responsive to reciprocating movement of said main piston in said main cylinder to actuate said subpiston and so restrict the opening of said valve.

RAYMOND C. PIERCE.